(12) United States Patent
Shimoda

(10) Patent No.: US 10,070,013 B2
(45) Date of Patent: *Sep. 4, 2018

(54) IMAGE PROCESSING SYSTEM AND USER INFORMATION SHARING METHOD

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Koichi Shimoda, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/627,625

(22) Filed: Jun. 20, 2017

(65) Prior Publication Data

US 2017/0289401 A1 Oct. 5, 2017

Related U.S. Application Data

(63) Continuation of application No. 14/977,954, filed on Dec. 22, 2015, now Pat. No. 9,692,941.

(51) Int. Cl.
*H04N 1/44* (2006.01)
*H04N 1/00* (2006.01)
*H04N 1/36* (2006.01)

(52) U.S. Cl.
CPC ....... *H04N 1/4413* (2013.01); *H04N 1/00347* (2013.01); *H04N 1/36* (2013.01);
(Continued)

(58) Field of Classification Search
USPC ...................................................... 358/1.14
See application file for complete search history.

(56) References Cited

U.S. PATENT DOCUMENTS 8,248,630 B2 8/2012 Fukuda
2009/0180138 A1* 7/2009 Fukuda ............. H04N 1/00912
358/1.15

(Continued)

OTHER PUBLICATIONS

Non-Final Office Action for U.S. Appl. No. 14/977,954 dated Sep. 29, 2016, 23 pages.

*Primary Examiner* — Ngon Nguyen
(74) *Attorney, Agent, or Firm* — Amin, Turocy & Watson LLP

(57) ABSTRACT

An image processing system comprises a master image processing apparatus provided with an image forming section for processing an image and a slave image processing apparatus provided with an image forming section for forming an image. The master image processing apparatus comprises a first user information storage section which stores user information, an acquisition section, a first user information update section which updates the user information stored in the first user information storage section according to the user information acquired by the acquisition section and a sending section which sends the user information acquired by the acquisition section to the slave image processing apparatus. A second user information storage section of the slave image processing apparatus stores the user information. A second user information update section updates the user information stored in the second user information storage section according to the user information received by a receiving section.

10 Claims, 7 Drawing Sheets

(52) U.S. Cl.
CPC .............. *H04N 2201/0031* (2013.01); *H04N 2201/0094* (2013.01)

(56) References Cited

U.S. PATENT DOCUMENTS

2010/0073720 A1\* 3/2010 Wakui .................. G06F 3/1219
  358/1.15
2016/0080200 A1\* 3/2016 Ishii .................... H04L 41/0806
  709/211

\* cited by examiner

IMAGE PROCESSING SYSTEM AND USER INFORMATION SHARING METHOD

CROSS-REFERENCE TO RELATED APPLICATIONS

This application is a Continuation of application Ser. No. 14/977,954 filed on Dec. 22, 2015, the entire contents of which are incorporated herein by reference.

FIELD

Embodiments described herein relate generally to an image processing system and a user information sharing method.

BACKGROUND

In image processing apparatuses used by a plurality of users, there is an image processing apparatus which authenticates each user when the user uses the image processing apparatus. Each user registers user information in advance every time the user is authenticated to use the image processing apparatus. Further, in some cases, a plurality of image processing apparatuses is connected with each other by an internet when in use.

The user needs to respectively register user information in a plurality of image processing apparatuses. Thus, it is troublesome for the user to register user information if there are a great many image processing apparatuses.

DETAILED DESCRIPTION

In accordance with an embodiment, an image processing system comprises a master image processing apparatus and a slave image processing apparatus. The master image processing apparatus comprises an image forming section for processing an image. The slave image processing apparatus comprises an image forming section for forming an image. The master image processing apparatus comprises a first user information storage section, an acquisition section, a first user information update section and a first communication section. The first user information storage section stores user information. The acquisition section acquires the user information. The first user information update section updates the user information stored in the first user information storage section according to the user information acquired by the acquisition section. The first communication section sends the user information acquired by the acquisition section to the slave image processing apparatus. The slave image processing apparatus comprises a second user information storage section, a second communication section and a second user information update section. The second user information storage section stores the user information. The second communication section receives the user information sent from the master image processing apparatus. The second user information update section updates the user information stored in the second user information storage section according to the user information received by the second communication section.

The embodiment of the present invention is described below with reference to the accompanying drawings.

Figure 1:
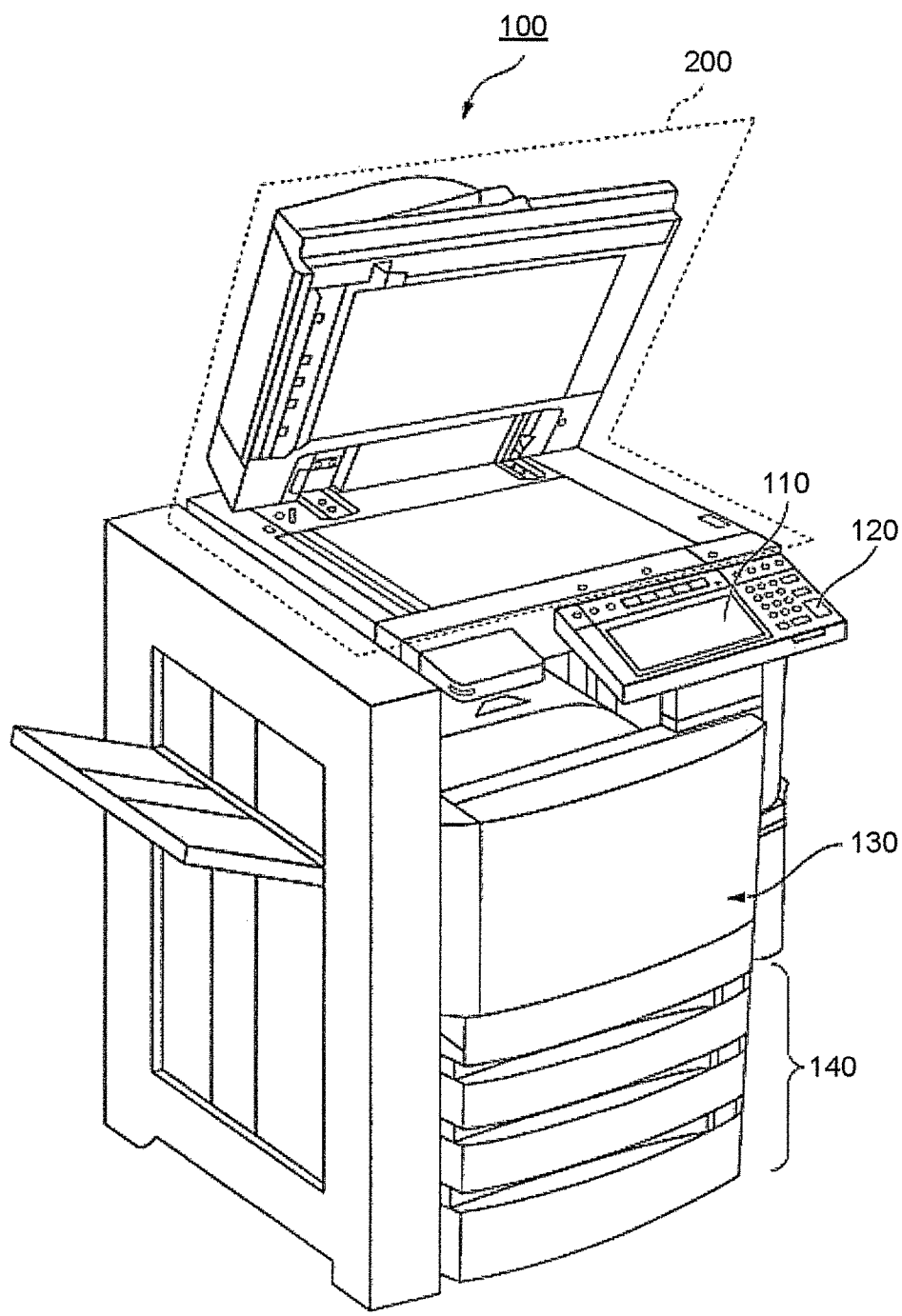
FIG. 1 is an external view exemplifying an image processing apparatus according to an embodiment.

FIG. 1 is an external view exemplifying the overall structure of a master image processing apparatus 100 according to the embodiment. For example, the master image processing apparatus 100 is an image processing apparatus such as an MFP (multifunction peripheral). The master image processing apparatus 100 comprises a display 110, a control panel 120, a printer section 130, a sheet accommodation section 140 and an image reading device 200. The printer section 130 of the master image processing apparatus 100 may be a toner image fixing device or an inkjet device.

The master image processing apparatus 100 reads the image presented on a sheet and generates digital data, thereby generating an image file. The sheet is, for example, an original document or a sheet on which characters or images are recorded. The sheet can be any sheet that is readable to the master image processing apparatus 100.

The master image processing apparatus 100 is used by a plurality of users who logs in separately. The master image processing apparatus 100 receives a user ID and a password input on the control panel 120. The user ID and the password are received after the user ID and the password are input and a login button is pressed. Then, the master image processing apparatus 100 authenticates the user according to the received user ID and password. The master image processing apparatus 100 allows an authenticated user to log in the master image processing apparatus 100. The user can log in after being allowed to log in the master image processing apparatus 100. The user who logs in can use the master image processing apparatus 100.

The display 110 is an image display device such as a liquid crystal display, an organic EL (Electro Luminescence) display and the like. The display 110 displays various kinds of information relating to the master image processing apparatus 100. Further, the display 110 and the control panel 120 may be integrated into a touch panel.

The control panel 120 is provided with hardware keys for receiving the input operation of the user on the hardware keys. For example, the control panel 120 includes a power button, numerical keys, character input keys, a login button and a logout button. The control panel 120 further includes a user registration button, a user information update button, a user information deletion button and a registration determination button.

The power button is a button for switching on or off the power source of the master image processing apparatus 100. The numerical keys and the character input keys are keys for respectively inputting numerals and characters. Input numerals and characters are displayed on the display 110. The login button is a button for the user to log in. The logout button is a button for the user to log out.

The user registration button is a button for starting the registration operation of user information. Further, identification information such as a password is contained in the user information. The user information update button is a button for starting the update operation of the user information registered already. The user information deletion button is a button for starting the deletion operation of the user information registered already. Information relating to the image processing setting set for each user of the master image processing apparatus 100 is contained in the user information.

The control panel 120 receives the input operation performed on these buttons and keys. For example, the control panel 120 receives an input operation performed on the numerical keys which are used to set the number of the sheets to be printed using a copy or print function. Further, the control panel 120 receives an input operation performed on the numerical keys and the character input keys which are used by the user to input a password.

The control panel 120 receives an input operation of the user regarding the function or setting of the master image processing apparatus 100 when the user logs in the master image processing apparatus 100. For example, the control panel 120 receives an input operation of selecting a function from a plurality of functions needed by the user. The various functions include a copy function, a print function, a scan function and a facsimile function. The control panel 120 receives an input operation of selecting the type or size of a sheet to be printed using the copy or print function. The control panel 120 receives an input operation of selecting or inputting a sending destination of a facsimile to be sent using the facsimile function. Further, the control panel 120 receives an input operation performed on the logout button which enables the user who is logging in to log out.

After receiving an input operation performed on the user information registration button, the control panel 120 receives an input operation relating to the registration of user information. For example, the control panel 120 receives an input operation performed on the numerical keys and the character input keys which are used for inputting a user ID and a password. After receiving the input operation performed on the numerical keys and the character input keys, the control panel 120 receives an operation performed on the login determination key.

After receiving an input operation performed on the user information update button, the control panel 120 receives an input operation relating to the update of the registered user information. For example, the control panel 120 receives an input operation performed on the numerical keys and the character input keys for inputting a user ID and a password. After receiving the input operation performed on the numerical keys and the character input keys, the control panel 120 receives an input operation performed on the login determination button.

The printer section 130 forms an image on a sheet according to the image information generated by the image reading device 200 or the image information received through a communication path. For example, the printer section 130 forms an image by, for example, carrying out the following processing: the image forming section of the printer section 130 forms an electrostatic latent image on a photoconductive drum according to the image information. The image forming section of the printer section 130 forms a visible image by making a developing agent adhere to the electrostatic latent image. The developing agent is, for example, a toner. The transfer section of the printer section 130 transfers the visible image onto a sheet. The fixing section of the printer section 130 heats and presses the sheet to fix the visible image on the sheet. Further, the sheet on which the image is formed is a sheet accommodated in the sheet accommodation section 140 or a manually fed sheet.

The sheet accommodation section 140 accommodates a sheet which is used in the printer section 130 for the formation of an image.

The image reading device 200 reads the image information of a read object as light intensity. The image reading device 200 records the read image information. The recorded image information may be sent to another information processing apparatus via a network. The recorded image information may be formed by the printer section 130 into an image on a sheet.

Figure 2:
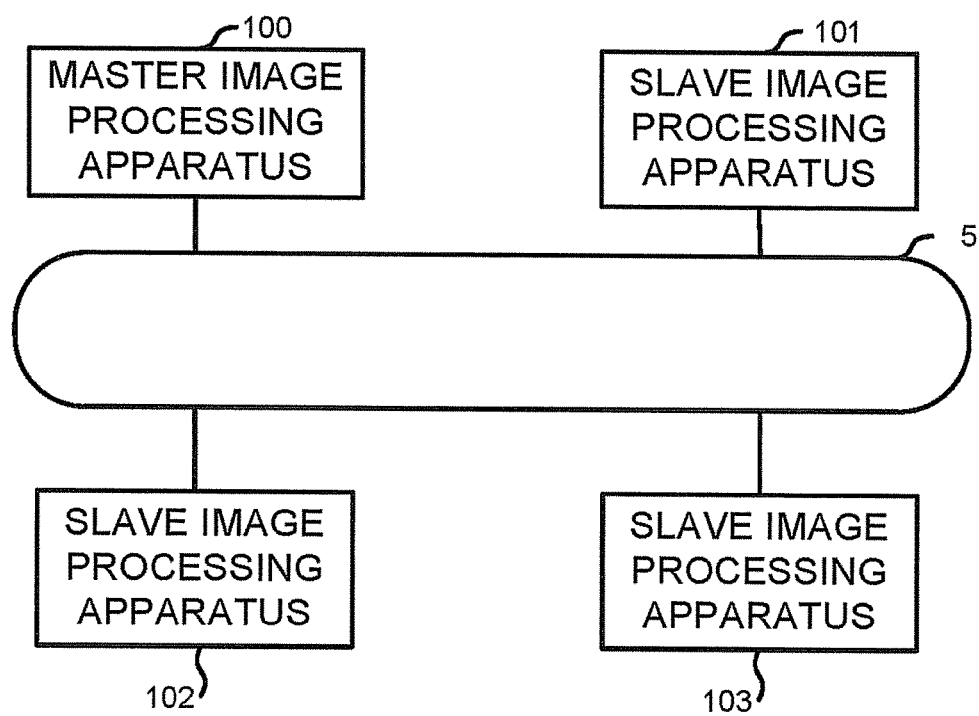
FIG. 2 is a block diagram exemplifying the structure of an image processing system according to the embodiment.

FIG. 2 is a block diagram exemplifying the structure of an image processing system 1 according to the embodiment. The image processing system 1 is provided with a master image processing apparatus 100 serving as a first image processing apparatus. The image processing system 1 is further provided with slave image processing apparatuses 101, 102, 103 . . . serving as second image processing apparatuses. The master image processing apparatus 100 and the slave image processing apparatuses 101, 102, 103 . . . can be connected with each other in a communicable manner via a network 5. The network 5 is an information communication network such as an Internet or an LAN (Local Area Network).

Further, in the following description, the slave image processing apparatuses 101, 102, 103 . . . have the same structure. Further, the slave image processing apparatus 101 hereinafter exemplifies the slave image processing apparatuses 101, 102, 103 . . . if the slave image processing apparatuses 101, 102, 103 . . . are not particularly distinguished from each other.

Figure 3:
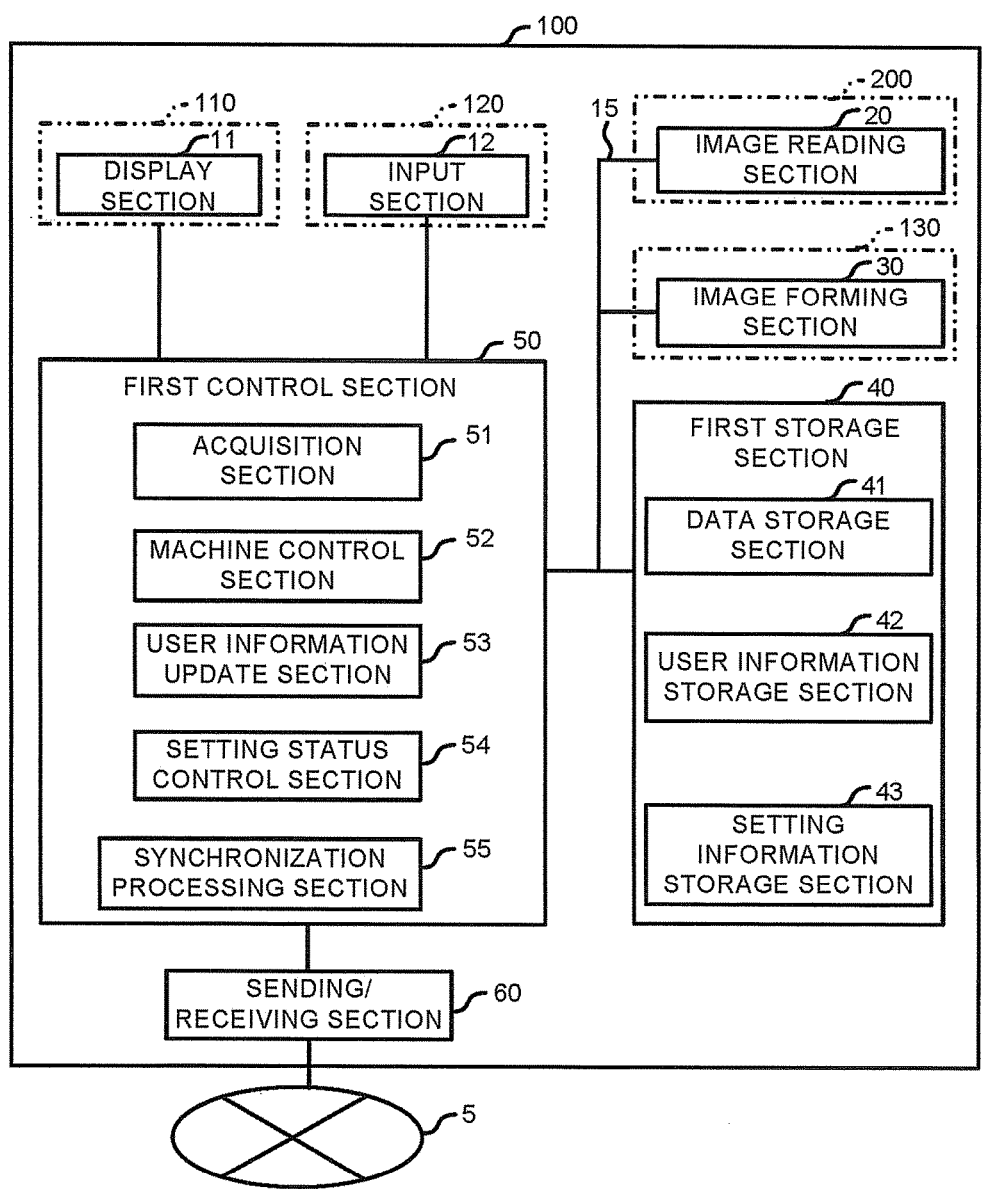
FIG. 3 is a block diagram exemplifying the structure of a master image processing apparatus according to the embodiment.

FIG. 3 is a block diagram exemplifying the structure of the master image processing apparatus 100 according to the embodiment. The master image processing apparatus 100 comprises a display section 11, an input section 12, an image reading section 20 and an image forming section 30. The master image processing apparatus 100 further comprises a first storage section 40, a first control section 50 and a sending/receiving section 60. The sections of the master image processing apparatus 100 are all connected with and exchange data with each other by an internal bus line 15.

Figure 4:
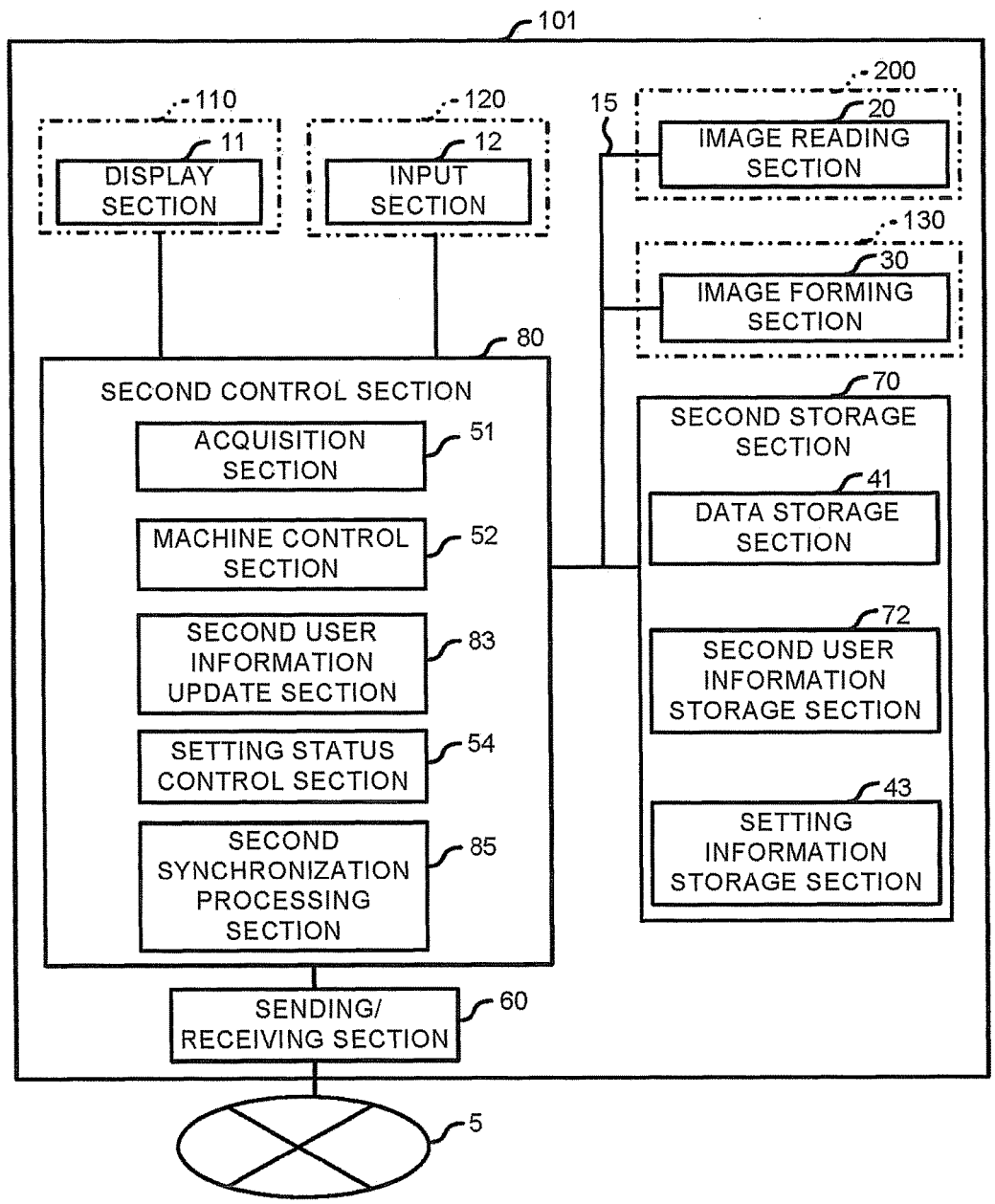
FIG. 4 is a block diagram exemplifying the structure of a slave image processing apparatus according to the embodiment.

FIG. 4 is a block diagram exemplifying the structure of the slave image processing apparatus 101 according to the embodiment. The slave image processing apparatus 101 comprises a display section 11, an input section 12, an image reading section 20, an image forming section 30 and a sending/receiving section 60 which are identical to those of the master image processing apparatus 100. The slave image processing apparatus 101 further comprises a second storage section 70 and a second control section 80. The second storage section 70 is structurally identical to the first storage section 40 of the master image processing apparatus 100. The second control section 80 is structurally identical to the first control section 50 of the master image processing apparatus 100. For the sake of convenience of description later, the storage section and the control section of the master image processing apparatus 100 are separately referred to as the first storage section 40 and the first control section 50. The storage section and the control section of the slave image processing apparatus 101 are separately referred to as the second storage section 70 and the second control section 80.

The display section 11 is a display device which displays an image corresponding to the image information supplied from the first control section 50. For example, the display section 11 displays a screen used at the time of the login of the user in a case where the image information appearing at the time of the start of the registration of user information is supplied from the first control section 50.

The input section 12 is an input device for receiving an input operation performed on each button and each key of the control panel 120. For example, the input section 12 receives the registration of user information through an input operation carried out by the user on the control panel 120. Further, if the input operation of the user is received, the input section 12 supplies input operation information corresponding to the received input operation to the first control section 50.

The image reading section 20 comprises a sensor such as a CIS (Contact Image Sensor) or a CCD (Charge Coupled Device). For example, the image reading section 20 uses the sensor to read an original document or a sheet on which characters or images are recorded to generate digital data. Further, the image reading section 20 is mounted in the image reading device 200 shown in FIG. 1.

The image forming section 30 prints an image or characters corresponding to the digital data on a sheet such as a print paper. Not limited to carry out a print job by fixing a toner image, the image forming section 30 can also print using an inkjet system or using another image formation system. Further, the image forming section 30 is mounted in the printer section 130 shown in FIG. 1.

The first storage section 40 consists of a recording medium such as a flash ROM or an HDD (Hard Disk Drive) or a combination of these recording mediums. The first storage section 40 stores programs, data and various kinds of information used for controlling each section of the master image processing apparatus 100. For example, the first storage section 40 comprises a data storage section 41, a user information storage section 42 and a setting information storage section 43.

The data storage section 41 stores various kinds of information and data needed for the execution of various functions including a copy function, a print function, a scan function and a facsimile function. For example, the data storage section 41 stores information indicating the function, the type or size of a sheet to be printed and the number of the sheets to be printed which are selected through an operation of the user. The data storage section 41 stores the digital data resulting from the reading of a sheet by the image reading section 20. The data storage section 41 stores digital data received by means of a facsimile function when the master image processing apparatus 100 executes the facsimile function. For example, the image forming section 30 prints an image or characters corresponding to the digital data stored in the data storage section 41 on a sheet.

The user information storage section 42 stores user information of the registered user permitted to use the master image processing apparatus 100. For example, the user information storage section 42 stores the user ID and the password of a user permitted to use the master image processing apparatus 100 in an associated manner as user information. The user information storage section 42 stores the user ID of a user in association with setting status information indicating a setting status of the master image processing apparatus 100 used by the user.

The user information stored in the user information storage section 42 is registered or updated by a user information update section 53 arranged in the first control section 50. Alternatively, the user information stored in the user information storage section 42 is deleted by the user information update section 53.

The setting information storage section 43 stores setting status information indicating the setting status of the master image processing apparatus 100. For example, the setting status of the master image processing apparatus 100 is a setting status indicating which function is selected from a plurality of functions including a copy function, a print function, a scan function and a facsimile function. Further, one of the foregoing setting statuses may be a setting status indicating the type or size of a sheet to be printed or a setting status indicating the number of sheets to be printed using a copy or print function. Further, one of the foregoing setting statuses may be a setting status indicating the sending destination of a facsimile to be sent using a facsimile function.

The first control section 50 is provided with a CPU (Central Processing Unit) or a dedicated processor functioning as the control center of the master image processing apparatus 100. The first control section 50 controls each section of the master image processing apparatus 100. For example, the first control section 50 comprises an acquisition section 51, a machine control section 52, the user information update section 53, a setting status control section 54 and a synchronization processing section 55.

The acquisition section 51 acquires information supplied from the control panel 120. For example, the acquisition section 51 acquires the input operation information supplied from the control panel 120. The input operation information contains the information received by the control panel 120. The information received by the control panel 120 includes login information relating to the input operation of the numerical keys and the character input keys. The input operation of the numerical keys and the character input keys is an input operation for a user to input a password for login.

Further, the information received by the control panel 120 includes user information registration start information based on an input operation performed on the user information registration button. The information received by the control panel 120 includes user information update start information based on an input operation performed on the user information update button. The information received by the control panel 120 includes user information based on an input operation performed on the numerical keys and the character input keys. The information received by the control panel 120 includes user information registration deletion information based on an input operation performed on the user information deletion button.

The acquisition section 51 acquires information sent by the sending/receiving section 60. For example, the master image processing apparatus 100 is connected with the slave image processing apparatus 101 via the network 5. In this case, the acquisition section 51 acquires user registration association information sent from the slave image processing apparatus 101. The user registration association information includes request information for prompting the master image processing apparatus 100 to register or update user information. The request information contains user information. The slave image processing apparatus 101 prompts the master image processing apparatus 100 to register or update the user information contained in the request information.

Alternatively, it is assumed that the master image processing apparatus 100 is connected with an external information input section via the network 5. In this case, user information registration start information, if sent from the external information input section, is acquired. Further, user information, if sent from the external information input section, is acquired.

The machine control section 52 executes various functions by controlling the operations of each section of the master image processing apparatus 100. A plurality of functions includes a copy function, a print function, a scan function and a facsimile function. For example, the machine control section 52 controls the operations of each section of the master image processing apparatus 100 according to a function selected by an input operation of the user received by the input section 12.

The machine control section 52 controls the operations of each section of the master image processing apparatus 100 according to information set through an input operation of the user. Specifically, the machine control section 52 controls the reading operation of the image reading section 20 according to an input operation of the user. Further, the machine control section 52 controls the storage of the digital data generated by the image reading section 20 in the data storage section 41. Further, the machine control section 52 controls the reading of digital data from the data storage section 41 or the printing of the read digital data by the image forming section 30. The machine control section 52 carries out an image control to control the display of an image on the display section 11.

The user information update section 53 controls the user information stored in the user information storage section 42 according to the information acquired by the acquisition section 51. It is assumed that the user information update section 53 acquires user information after the acquisition section 51 acquires user information registration start information. In this case, the user information update section 53 enables the user information storage section 42 to store the acquired user information.

It is assumed that the acquisition section 51 acquires user information update start information if the user information is stored in the user information storage section 42. Then, it is assumed that the user information update section 53 acquires the user information. In this case, the user information update section 53 updates the user information stored in the user information storage section 42 to be the user information acquired by the acquisition section 51. The user information update section 53 deletes the user information stored in the user information storage section 42 if user information registration deletion information is acquired by the acquisition section 51.

The setting status control section 54 controls the setting status of the master image processing apparatus 100. The setting status control section 54 refers to the setting status information stored in the setting information storage section 43. The setting status control section 54 refers to setting status information when setting the setting status of the master image processing apparatus 100. The setting status control section 54 causes the master image processing apparatus 100 to be in the setting status stored in the setting information storage section 43.

The synchronization processing section 55 carries out a synchronization processing with a second synchronization processing section 85 of the slave image processing apparatus 101 when a synchronization processing execution condition for the start of a synchronization processing is met. In the synchronization processing, the user information stored in the user information storage section 42 of the first storage section 40 is supplied to the sending/receiving section 60. The sending/receiving section 60 sends the supplied user information to the slave image processing apparatus 101.

The synchronization processing execution condition is set in advance. For example, the synchronization processing execution condition can be set to be a specific time such as 12 pm. The specific time is preset and can be reset. In this case, a synchronization time input section is arranged in the master image processing apparatus 100 to input a time at which a synchronization processing is executed. There may be one specific time in one day. Or there may be a plurality of specific times in one day. For example, start time of the synchronization processing may be 8 am, 12 am and 6 pm in one day, that is, three times a day. Alternatively, for example, the set specific time may also be assumed to be each day of the week or every day.

Another synchronization processing execution condition can be assumed to be that a certain time such as 24 hours elapses after the execution of the former synchronization processing. The certain time is preset. The certain time at which the synchronization processing is executed can be reset by the service staff or the user. Further, a plurality of certain times may be set. Alternatively, the synchronization processing execution condition can be assumed to be the registration or update of user information by the user information update section 53.

The sending/receiving section 60 receives the various kinds of information sent from the slave image processing apparatus and supplies the received information to the first control section 50. When the network 5 is connected with the external information input section, the sending/receiving section 60 supplies the various kinds of information sent from the external information input section to the first control section 50. Further, the sending/receiving section 60 sends the various kinds of information supplied from the first control section 50 to the slave image processing apparatuses 101, 102, 103 . . . via the network 5. Data communication is executed in the sending/receiving section 60 in a parallel communication manner, thus increasing communication speed. Thus, when data is sent to or received from a plurality of slave image processing apparatuses 101, 102, 103 . . . , the data sending and receiving can be smoothly executed. However, data communication may also be executed in a serial communication manner but not a parallel communication manner.

Each component in the slave image processing apparatus 101 is identical to that in the master image processing apparatus 100. For the sake of convenience of description, the user information storage section in the second storage section 70 is referred to as a second user information storage section 72. The user information update section in the second control section 80 is referred to as a second user information update section 83. The synchronization processing section of the second control section 80 is referred to as a second synchronization processing section 85.

Figure 6:
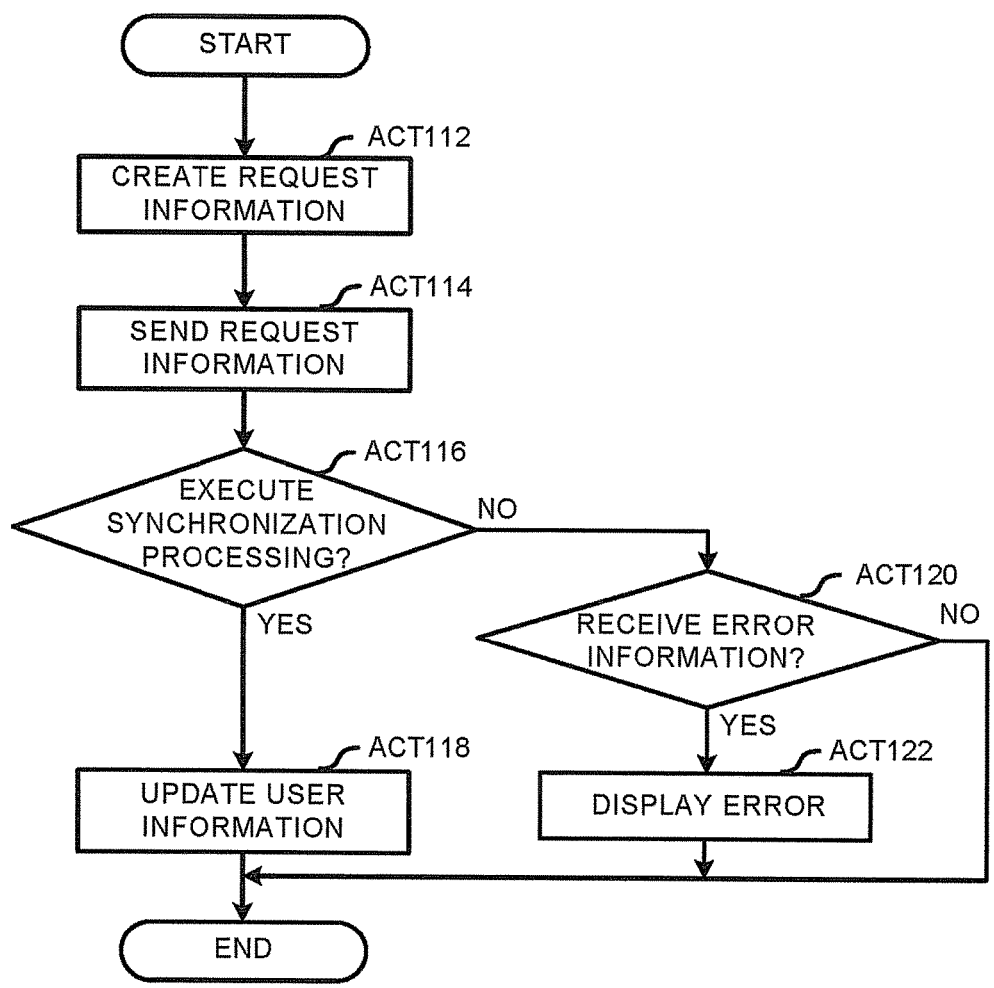
FIG. 6 is a flowchart exemplifying the procedures of an information sharing processing carried out in a slave image processing apparatus sending request information.
Figure 7:
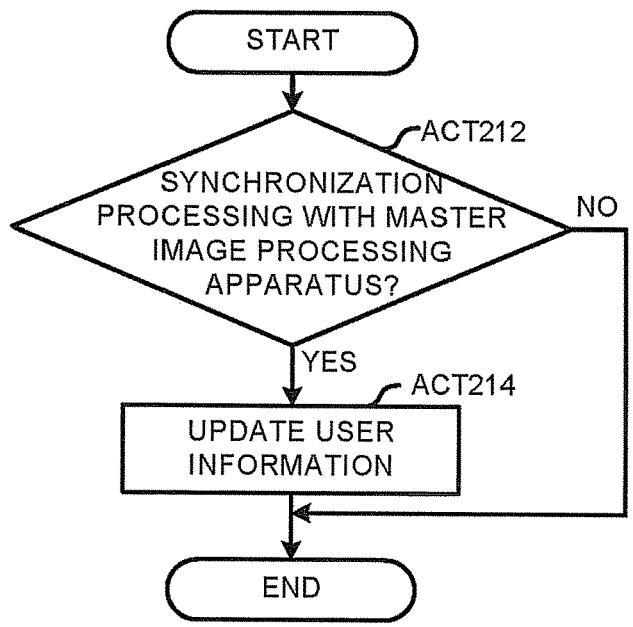
FIG. 7 is a flowchart exemplifying the procedures of an information sharing processing carried out in a slave image processing apparatus other than the slave image processing apparatus sending the request information.

Next, a user information sharing processing of sharing the user information carried out by the image processing system according to the present embodiment is described with reference to FIG. 5-FIG. 7. The user information sharing processing is carried out by the master image processing apparatus 100 and the slave image processing apparatuses 101, 102, 103 . . . arranged in the image processing system 1. Herein, the synchronous sharing processing of the user information updated by the master image processing apparatus 100 with the slave image processing apparatuses 101, 102, 103 . . . is described.

Figure 5:
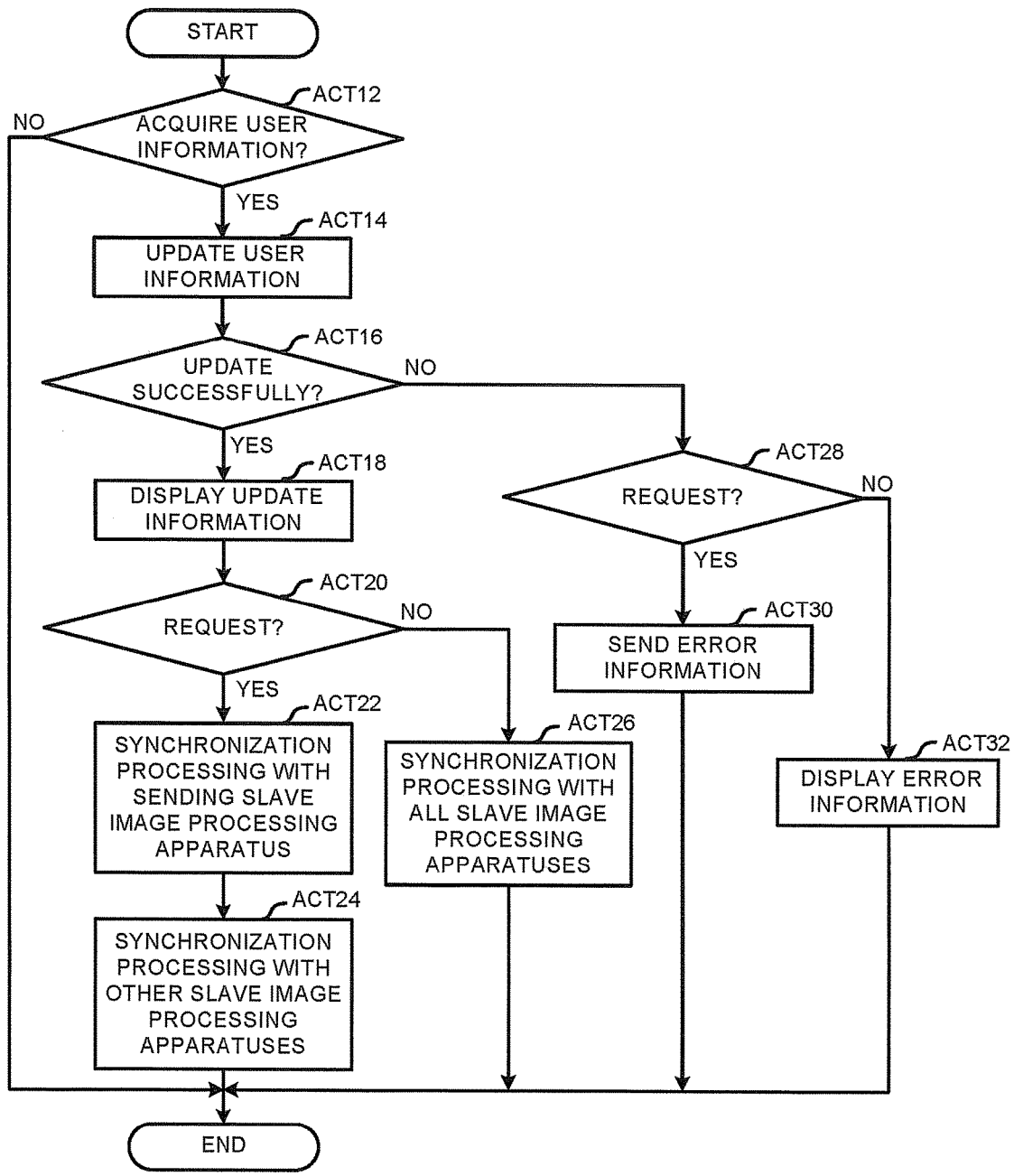
FIG. 5 is a flowchart exemplifying the procedures of an information sharing processing carried out in the master image processing apparatus.

The processing shown in the flowchart of FIG. 5 is carried out in the master image processing apparatus 100. The first control section 50 in the master image processing apparatus 100 first determines whether or not user information is acquired (Act 12). Herein, the first control section 50 determines whether or not user information is supplied to the acquisition section 51.

As a result, the first control section 50 determines that no user information is acquired as no user information is supplied to the acquisition section 51 (Act 12: No). In this case, the first control section 50 ends the processing carried out in the master image processing apparatus 100 for sharing user information without making any change. Contrarily, the first control section 50 determines that user information is acquired as user information is supplied to the acquisition section 51 (Act 12: Yes). In this case, the user information update section 53 updates the user information stored in the user information storage section 42 (Act 14). If no user information is stored in the user information storage section 42, the user information update section 53 registers the acquired user information in the user information storage section 42, thereby storing the acquired user information.

Sequentially, the first control section 50 determines whether or not user information is successfully updated (Act 16). As a result, it is assumed that the first control section 50 determines that user information is successfully updated (Act 16: Yes). In this case, the machine control section 52 supplies update information indicating the success of the update of user information to the display section 11. In this way, the machine control section 52 enables the display section 11 to display an update information image corresponding to the update information (Act 18).

The first control section 50 determines whether or not the acquired user information is the information contained in the request information received from the slave image processing apparatus 101 (Act 20). As a result, it is assumed that the first control section 50 determines that the acquired user information is the information contained in the request information received from the slave image processing apparatus 101 (Act 20: Yes). In this case, the synchronization processing section 55 carries out a user information synchronization processing with the second synchronization processing section 85 of the slave image processing apparatus 101 sending the request information (Act 22). As the user information synchronization processing described herein, the synchronization processing section 55 sends update completion information to the second synchronization processing section 85 of the slave image processing apparatus 101.

Next, the synchronization processing section 55 carries out a user information synchronization processing with the second synchronization processing sections 85 of the other slave image processing apparatuses 102, 103 . . . (Act 24). As the user information synchronization processing described herein, the synchronization processing section 55 transfers updated user information to the second synchronization processing sections 85 of the other slave image processing apparatuses 102, 103 . . . . In this way, the first control section 50 ends the processing carried out in the master image processing apparatus 100.

The other slave image processing apparatuses 102, 103 . . . are slave image processing apparatuses other than the slave image processing apparatus 101 sending the user information.

Further, it is assumed that the acquired user information is not the information contained in the request information received from the slave image processing apparatus 101 (Act 20: No). In this case, the user information is the information updated by the master image processing apparatus 100. Thus, there is no slave image processing apparatus which sends user information. Thus, the synchronization processing section 55 can carry out a user information synchronization processing with the second synchronization processing sections 85 of all slave image processing apparatuses 101, 102, 103 . . . (Act 26). As the user information synchronization processing, the synchronization processing section 55 sends updated user information to the second synchronization processing sections 85. In this way, the first control section 50 ends the processing carried out by the master image processing apparatus 100.

Further, it is determined that user information is not successfully updated by the first control section 50 in Act 16 (Act 16: No). In this case, it is determined whether or not the acquired user information is the information contained in the request information received from the slave image processing apparatus 101 (Act 28). The determination is carried out in the same way as the determination executed in Act 20.

As a result, it is determined that the acquired user information is the information contained in the request information received from the slave image processing apparatus 101 (Act 28: Yes). In this case, the first control section 50 sends error information to the slave image processing apparatus 101 which sends the user information (Act 30). In this way, the first control section 50 ends the processing carried out by the master image processing apparatus 100.

Contrarily, it is determined that the acquired user information is not the information contained in the request information received from the slave image processing apparatus 101 (Act 28: No). In this case, the machine control section 52 of the first control section 50 supplies error information indicating the failure of the update of the user information to the display section 11. Then, the machine control section 52 enables the display section 11 to display an error display screen corresponding to the error information (Act 32). In this way, the first control section 50 ends the processing carried out by the master image processing apparatus 100.

Next, the processing in the slave image processing apparatus 101 is described in a case in which the slave image processing apparatus 101 sends request information containing user information. The processing shown in the flowchart of FIG. 6 is carried out in the slave image processing apparatus 101. First, request information is created in the second control section 80 of the slave image processing apparatus 101 (Act 112). The request information containing user information is generated.

Sequentially, the second control section 80 sends the generated request information to the master image processing apparatus 100 (Act 114). After the request information is sent, the master image processing apparatus 100 carries out the processing shown in FIG. 5. Update completion information is sent from the master image processing apparatus 100 to the slave image processing apparatus 101 based on the result of the processing shown in FIG. 5 (Act 22). Alternatively, error information is sent from the master image processing apparatus 100 to the slave image processing apparatus 101 (Act 30).

Next, the second synchronization processing section 85 determines whether or not to carry out a synchronization processing with the master image processing apparatus 100 (Act 116). Whether or not to carry out a synchronization processing is determined based on whether or not update completion information is sent from the synchronization processing section 55. As a result, the second synchronization processing section 85 determines to carry out a synchronization processing as update completion information is received (Act 116: Yes). In this case, the user information contained in the request information is registered in the master image processing apparatus 100. Alternatively, the user information stored in the updated master image processing apparatus 100 is updated to be the user information contained in the request information. Thus, the second user information update section 83 updates the user information stored in the second user information storage section 72 to be the user information contained in the request information (Act 118). In this way, the second control section 80 ends the processing carried out by the slave image processing apparatus 101.

Contrarily, the second control section 80 determines not to carry out a synchronization processing in Act 116 as no update completion information is received (Act 116: No). In this case, the second control section 80 determines whether or not error information is received (Act 120). As a result, the second control section 80 determines that error information is received (Act 120: Yes). In this case, the registration or update of the user information contained in the request information in the master image processing apparatus 100 fails. Thus, the second user information update section 83 supplies error information indicating the failure of the update of the user information to the display section 11. Then, the machine control section 52 enables the display section 11 to display an error display screen corresponding to the error information (Act 122). In this way, the second control section 80 ends the processing carried out by the slave image processing apparatus 101. On the other hand, the second control section 80 determines that no error information is received (Act 120: No). In this case, the second control section 80 ends the processing carried out by the slave image processing apparatus 101 without making any change.

Next, the processing carried out by the slave image processing apparatus 102 other than the slave image processing apparatus 101 sending the request information is described. The processing shown in the flowchart of FIG. 7 is carried out in the slave image processing apparatus 102. First, the second synchronization processing section 85 of the slave image processing apparatus 102 determines whether or not to carry out a synchronization processing with the master image processing apparatus 100 (Act 212). Whether or not to carry out a synchronization processing is determined based on whether or not updated user information is sent from the synchronization processing section 55 of the master image processing apparatus 100.

As a result, it is assumed that the second synchronization processing section 85 determines to carry out a synchronization processing as update completion information is received (Act 212: Yes). In this case, the second control section 80 updates the user information to be the updated user information (Act 214). In this way, the second control section 80 ends the processing carried out by the slave image processing apparatus 102. Contrarily, the second synchronization processing section 85 determines not to carry out a synchronization processing as no update completion information is received (Act 212: No). In this case, the second control section 80 ends the processing carried out by the slave image processing apparatus 102 without updating the user information.

Figure 8:
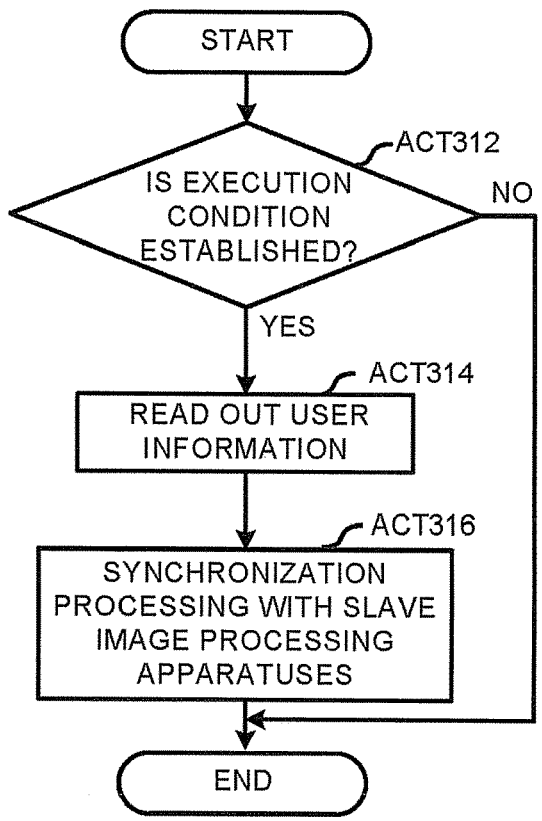
FIG. 8 is a flowchart exemplifying the procedures of an information sharing processing collectively executing a synchronization processing carried out in the master image processing apparatus.

Further, when another synchronization processing execution condition different from the one described above is established, in some cases, the synchronization processing section 55 carries out a synchronization processing collectively with the second synchronization processing sections 85. Next, the processing carried out by the master image processing apparatus 100 for executing a synchronization processing collectively with the slave image processing apparatuses is described below. The processing shown in the flowchart of FIG. 8 is carried out in the master image processing apparatus 100.

First, the synchronization processing section 55 determines whether or not a synchronization processing execution condition is established (Act 312). It is assumed that the synchronization processing section 55 determines that the synchronization processing execution condition is established (Act 312: Yes). In this case, the synchronization processing section 55 reads out the user information stored in the user information storage section 42 (Act 314). Sequentially, the synchronization processing section 55 carries out a synchronization processing with the second synchronization processing sections 85 of the slave image processing apparatuses 102, 103 . . . (Act 316). The synchronization processing section 55 sends the user information read from the user information storage section 42 to the second synchronization processing sections 85 every time the synchronization processing is carried out. In this way, the processing carried out by the master image processing apparatus 100 for executing a synchronization processing collectively with the slave image processing apparatuses is ended. On the other hand, if it is determined that the synchronization processing execution condition is not established (Act 312: No), the synchronization processing section 55 ends the processing for executing a synchronization processing collectively, without making any change.

The acquisition status of the read user information from the master image processing apparatus 100 is confirmed by the second synchronization processing sections 85 of the slave image processing apparatuses 101, 102, 103 . . . . If the acquisition of the read user information is confirmed, the second synchronization processing section 85 updates the user information stored in the second user information storage section 72 to be the read user information and registers the read user information. In this way, the synchronization processing executed with the synchronization processing section 55 of the master image processing apparatus 100 is ended.

In this way, the image processing system 1 of the present embodiment comprises the master image processing apparatus 100 and slave image processing apparatuses 101, 102, 103 . . . . In the master image processing apparatus 100, the user information update section 53 enables the user information storage section 42 to store the user information acquired by the acquisition section 51. Further, the synchronization processing section 55 sends the user information acquired by the acquisition section 51 to the second control sections 80 of the slave image processing apparatuses 101, 102, 103 . . . . Through the second control section 80, the received user information is stored in the second user information storage section 72. In the image processing system 1, a synchronization processing is carried out between the master image processing apparatus 100 and the slave image processing apparatuses 101, 102, 103 . . . aiming at the user information. If user information is registered in the master image processing apparatus 100 by a user, then the user information is also registered in the slave image processing apparatuses 101, 102, 103 . . . . Consequentially, the user information is shared between the master image processing apparatus 100 and the slave image processing apparatuses 101, 102, 103 . . . . Thus, the image processing system 1 makes the registration of user information less troublesome.

Further, user information can also be registered in the slave image processing apparatus 101. In this case, a synchronization processing is carried out between the slave image processing apparatus 101 and the master image processing apparatus 100 aiming at the user information registered in the slave image processing apparatus 101. The master image processing apparatus 100 also carries out a synchronization processing with the other slave image processing apparatuses 102, 103 aiming at the user information to which the synchronization processing is carried out. In this way, the user information is shared between the master image processing apparatus 100 and the slave image processing apparatuses 101, 102, 103 . . . . Thus, the image processing system 1 can make the registration of user information less troublesome. Further, an input operation for registering user information may be carried out by the user in the slave image processing apparatus 101 but not in the master image processing apparatus 100. Thus, the registration of user information can be further less troublesome.

Further, the master image processing apparatus 100 sends user information to the slave image processing apparatuses 101, 102, 103 . . . after registering and updating the user information. Thus, the master image processing apparatus 100 can determine whether or not user information can be registered and updated. It is not needed to determine whether or not user information can be registered and updated in the slave image processing apparatus 101. Further, the image processing system 1 can rapidly determine whether or not user information can be registered and updated. Furthermore, the communication of user information among the slave image processing apparatuses 101, 102, 103 . . . can be avoided. Thus, the image processing system 1 is capable of reducing the load of data communication. However, it may be assumed that whether or not user information can be registered and updated is determined by the slave image processing apparatus 101. Further, it may be assumed that the communication of user information among the slave image processing apparatuses 101, 102, 103 . . . can be executed. Further, a plurality of slave image processing apparatuses 101, 102, 103 . . . is connected with the master image processing apparatus 100 in the foregoing embodiment. On the contrary, it may also be assumed that only one slave image processing apparatus is connected with the master image processing apparatus. Further, only one master image processing apparatus 100 is set in the foregoing embodiment. On the contrary, it may be assumed that a plurality of image processing systems is connected with each other, and a plurality of master image processing apparatuses is arranged. In this case, user information can be sent and received among a plurality of master image processing apparatuses.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image processing system, comprising:
a first image processing apparatus and a plurality of second image processing apparatuses, wherein:
the first image processing apparatus comprises:
a first storage section configured to store first user information;
a first acquisition section configured to acquire other user information;
a first update section configured to update the first user information stored in the first storage section according to the other user information to yield updated user information;
a first sending section configured to:
in response to a determination that the first acquisition section acquires the other user information in request information received from a second image processing apparatus of the plurality of second image processing apparatuses, send the other user information to the second image processing apparatus without sending the other user information to other second image processing apparatuses of the plurality of second image processing apparatuses, and
in response to a determination that the first acquisition section does not acquire the other user information in the request information received from the second image processing apparatus, send the other user information to the plurality of second image processing apparatuses;
a synchronization processing section configured to carry out a synchronization processing for the updated user information in response to a determination that the first update section directly updated the first user information;
a second storage section configured to store second user information;
a second receiving section configured to receive the other user information sent by the first image processing apparatus; and
a second update section configured to update the second user information stored in the second storage section according to the other user information.

2. The image processing system according to claim 1, wherein
the synchronization processing section is configured to carry out the synchronization processing for the updated user information stored in the first storage section, the synchronization processing storing the updated user information in the second storage section in response to a synchronization processing execution condition being satisfied.

3. The image processing system according to claim 2, wherein the synchronization processing execution condition is a condition that the first user information stored in the first storage section is updated by the first update section.

4. The image processing system according to claim 1, wherein
the second image processing apparatus further comprises:
a second acquisition section configured to acquire third user information; and
a second sending section configured to send the third user information acquired by the second acquisition section to the first image processing apparatus, and
the first receiving section receives the third user information sent from the second communication section, and
the first acquisition section acquires the third user information received by the first receiving section.

5. The image processing system according to claim 4, wherein
the first image processing apparatus comprises a transfer section configured to transfer the third user information sent from the second sending section to a subset of the plurality of second image processing apparatuses that does not include the second image processing apparatus which sends the third user information to the first image processing apparatus.

6. A user information sharing method in an image processing system, comprising
storing, by a first image processing apparatus comprising at least one processor, first user information;
acquiring, by the first image processing apparatus, other user information;
updating, by the first image processing apparatus, the first user information stored according to the other user information to yield updated user information;
in response to determining that the other user information is acquired from request information received from a second image processing apparatus of a plurality of second image processing apparatuses, sending, by the first image processing apparatus, the other user information to the second image processing apparatus without sending the other user information to other second image processing apparatuses of the plurality of second image processing apparatuses;
in response to determining that the other user information is not acquired from the request information received from the second image processing apparatus, sending, by the first image processing apparatus, the other user information to the plurality of second image processing apparatuses;
carrying out a synchronization processing for the updated user information in response to a determination that the first update section directly updated the first user information;
storing, by the second image processing apparatus, second user information;
receiving, by the second image processing apparatus, the other user information sent from the first image processing apparatus; and
updating, by the second image processing apparatus, the second user information stored according to the other user information.

7. The user information sharing method according to claim 6, further comprising
performing, by the first image processing apparatus, the synchronization processing when in response to determining that a synchronization processing execution condition is met, wherein the synchronization processing is carried out for the first user information stored or the updated user information.

8. The user information sharing method according to claim 7, wherein
the performing comprises performing the synchronization processing in response to determining that the first user information is updated.

9. The user information sharing method according to claim 6, further comprising:
acquiring, by the second image processing apparatus, third user information; and
sending, by the second image processing apparatus, the third user information acquired to the first image processing apparatus.

10. The user information sharing method according to claim 9, further comprising
transferring, by the first image processing apparatus, the third user information to a subset of the plurality of second image processing apparatuses that does not include the second image processing apparatus which sends the third user information to the first image processing apparatus.

* * * * *